Aug. 29, 1967  L. T. TRIBE  3,338,259

AUTOMATIC REGULATING VALVES

Filed Jan. 19, 1965

United States Patent Office 3,338,259
Patented Aug. 29, 1967

3,338,259
AUTOMATIC REGULATING VALVES
Leonard T. Tribe, Waltham Chase, near Southampton, England, assignor to Plessey-UK Limited, Ilford, England, a British company
Filed Jan. 19, 1965, Ser. No. 426,544
Claims priority, application Great Britain, Jan. 24, 1964, 3,145/64
4 Claims. (Cl. 137—220)

ABSTRACT OF THE DISCLOSURE

A pressure-reducing valve for producing an outlet pressure independent of inlet pressure has a valve housing forming a through duct containing a valve seat which co-operates with the end of the skirt of a valve piston which has two concentric shells sliding respectively on a central stem and in an outer guide shell connected at its end to the stem by a non-pervious partition. Downstream pressure is admitted between this partition and the piston through the hollow stem, while the interior of the hollow piston is sealed from the downstream end by a flange of the stem in sliding contact with the bore of the piston shell. In one embodiment downstream pressure is free to enter the interior of the piston except for an atmospheric chamber between the end of the inner sleeve, the flange, and a collar of the flange, while in another embodiment the space inside the piston communicates with downstream pressure through a metering aperture and with the outer atmosphere through an adjustable restrictor.

---

This invention relates to regulating valves of the kind wherein a pressure drop in a flow of fluid is produced by a port controlled by a control edge of a skirt of a piston which operates in a cylindrical bore, and one face of which is acted-upon by the controlled pressure. It is an object of the invention to provide improved regulating valves of the kind specified which allow high sensitivity to be achieved while at the same time keeping flow along the piston skirt at a low value. The undesirability of such flow will be readily apparent since, for example, in the case in which the pressures upstream and downstream of the port aperture act respectively on the opposed sides of the piston seal, any flow along the piston will by-pass the controlled port.

With this object in view at least one of the cooperating cylinder surfaces of the piston skirt and the bore in which it slides is provided with a plurality of circumferential grooves which form eddy chambers dissipating the kinetic energy of the flow along the piston skirt. In practice it has been found that in a 2.5 inch diameter control piston for the intake duct of a gas engine the provision of, say, eight grooves, which may each have a width and a radial depth of about 0.04 inch, in the circumference of the piston will ensure satisfactory sealing qualities without the use of any piston rings or gaskets, which would be liable to introduce objectionable frictional resistance to the relatively weak control forces available.

Three embodiments of the invention will now be described in more detail, with reference respectively to FIGURE 1 and to FIGURES 2 and 3 respectively.

Figure 1:
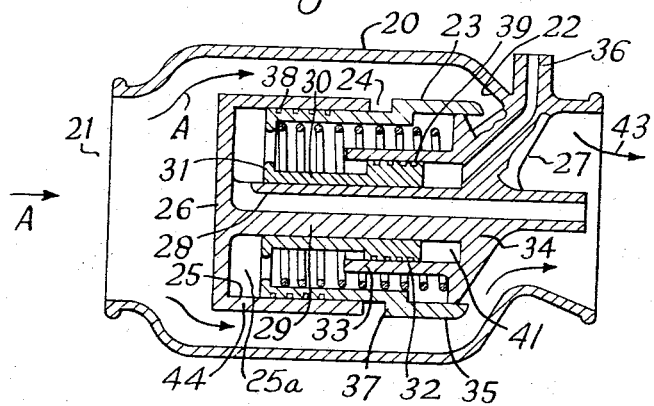
Figure 2:
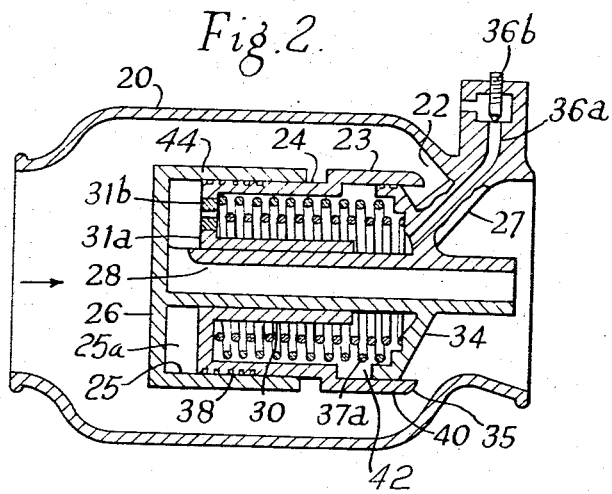

FIGURE 1 illustrates an embodiment in which pressure downstream of the throttle aperture is arranged to act against a spring supplemented by atmospheric pressure, and FIGURE 2 similarly illustrates an embodiment in which downstream pressure is arranged to act against a spring supported by an auxiliary pressure.

Referring now first to FIGURE 1, the valve housing forms a duct section 20 through which fluid is arranged to pass, entering at 21 in the direction of the arrow A. This duct section is formed with a conical valve seat 22, beyond which the controlled flow of fluid leaves the housing at 43. A valve piston 23, has a first large-diameter shell whose external cylindrical surface 24 co-operates with a bore 25 in a guide shell 44 projecting from a partition 26 which extends from a central stem 29 suspended by fins in the duct section 20, while a sleeve-like central shell 30 of the valve piston 23 has an axial bore 28 guided on this stem 29 of the valve housing. The said first piston 24 is connected at one end to the central shell 30 by a perforated partition element 31, and the other end of the central shell 30 is formed as an annular piston whose external cylinder surface 32 is substantially smaller in diameter than the external cylinder surface 24 of the first cylinder shell. This annular piston operates in a cylinder constituted by a collar 33 projecting axially towards the perforated partition element 31 from a flange 34 of the housing stem. The outer circumference of this flange 34 is in sliding contact with the bore of a second shell 35 extending from, but having a greater diameter than, the first shell 23, the diameter being equal to the external diameter of the first shell. The interior of the cylinder 41 constituted by the collar 33 communicates with the external atmosphere through a passage 36, which conveniently is conducted, as shown, through one of the fins or stays 27 by which the valve housing stem 29 is supported in the housing 20. The chamber 25a between the piston and the partition 26 communicates through a longitudinal bore 28 of the stem 29 with the flow downstream of the valve, and downstream pressure is admitted through the apertures in the partition element 31 into the interior of the shell 23. Downstream pressure therefore acts, in effect, upon the annular piston area determined by the outer cylinder surface 32 of the annular piston and the stem 29, and it is opposed by the atmospheric pressure admitted through passage 36 and acting upon an area of equal size, and by the tension of a regulating spring 37. It will be observed that the valve piston 23 is balanced as regards upstream pressure, since the action of the latter upon the seating end of the second shell 35 is opposed by the equal opposite action of the same pressure upon the shoulder formed between the first and second shells.

In order to minimise flow along the cylinder surface 24 from the inlet side to the interior of the chamber 25a and thence to the outlet side, i.e. of a flow which would by-pass the adjustable throttle orifice formed by the valve seat 22, that part of the outer surface 24 of the first shell is provided with a number of parallel circumferential labyrinth grooves 38 of small width and depth, which act as eddy chambers in which most of the kinetic energy of the flow is dissipated in eddy form, thereby reducing the portion of the total pressure drop available to overcome the laminar flow resistance in the interposed portions of the cylindrical gap between the piston shell and the cylinder bore. A further set of similar grooves 39 is provided in the outer surface 32 of the annular piston to reduce the escape of fluid under downstream pressure along the surface 32 from the interior of the first and second piston shells to the atmospheric passage 36.

In the modified construction of FIGURE 2, in which corresponding elements bear the same reference numerals as in FIGURE 1, an auxiliary pressure is derived from the outlet pressure by the series connection of a fixed metering orifice 31b, and an adjustable restrictor 36b. The metering orifice 31b is arranged to constitute the only perforation of the partition element 31a, and the interior 42 of the first and second shells communicates with the atmosphere through a duct 36a which contains the adjustable restrictor 36b. For operation this restrictor 36b is so adjusted that under normal working conditions a more than critical pressure drop is maintained between the duct 36a and the atmosphere. As a result the restrictor 36b will allow fluid to escape from the interior of the valve piston 23 to the atmosphere at a rate which is independent of the atmospheric pressure, and since under stable conditions fluid from the outlet side will enter the interior of the element 23 at the same rate through the metering orifice 31b, the orifice 31b will maintain a constant pressure difference between the interior of the valve element 23 and outlet pressure, which latter is admitted to the chamber 25a by the bore 28. In other words a small amount of fluid from the outlet side of the valve will pass through the metering orifice 31b into the chamber 25a inside the valve piston 23 and escape from there to the atmosphere via the restrictor 36b at a constant rate determined by the setting of the restrictor. A pressure drop across the metering orifice 31b will thus be established which is likewise constant, thereby maintaining a constant pressure drop between the two sides of the partition element 31a. The action of this pressure drop is opposed by a double spring 37a; and since this pressure drop can be made relatively small, the spring load, and consequently the spring rate, may be kept at a comparatively low value.

It will be readily appreciated that any increase in downstream pressure will tend to compress the spring 37a and thereby to reduce the width of the gap between the end of the shell 35 of the valve piston 23 and the valve seat 22 and thus reduce downstream pressure, similarly to the case of FIGURE 1. The labyrinth grooves 38 minimise flow from the upstream side along the cylinder surface 24 to the interior of the guide shell 44 which communicates with the downstream side, and a second set of circumferential labyrinth grooves 40 of similar construction is provided at the zone of contact between the flange 34 and the bore of the second shell 35 of the slide valve piston 23 to prevent leakage from the interior of the slide valve piston to the downstream side of the valve.

It will be appreciated that the embodiments described with reference to FIGURES 1 and 2 more particularly show the application of the invention to pressure-reducing valves which are required to produce a constant downstream pressure.

What I claim is:

1. An automatic pressure-reducing valve, comprising a housing in the form of a duct section having an inlet end and outlet end and formed with an annular valve seat between said ends, a central stem supported in the housing at a point between said valve seat and outlet end and projecting towards said inlet end beyond said valve seat, and joined at its free end to a transverse partition, a cylindrical guide shell extending from said partition towards the outlet end concentrically with said stem to encircle the stem for part of its length in spaced relation thereto, a valve piston having a first cylindrical piston shell slidingly co-operating with said guide shell, a second cylindrical piston shell adjoining said first piston shell and having an end face co-operating with said valve seat to form a variable throttle orifice in said passage, a third piston shell slidingly co-operating with said stem, a partition element mechanically connecting said third piston shell to said first and second piston shells to form a chamber inside the guide shell between the transverse partition and said partition element, said stem containing a passage interconnecting said chamber with the interior of said duct section between the valve seat and the outlet end, a flange extending from said stem at a distance from said transverse partition into sliding contact with the said second shell, means forming between said valve piston and at least part of the area of said flange a further chamber, the valve housing having passage means establishing communication between said further chamber and the atmosphere, and labyrinth grooves being provided in one of the slidingly co-operating surfaces of said guide shell and first piston shell, and spring means urging said valve piston away from said valve seat.

2. A valve as claimed in claim 1, wherein the first piston shell co-operates with the inner surface of the guide shell, the outside diameter of said first piston shell being equal to the diameter of said flange.

3. A valve as claimed in claim 1, wherein the partition element is apertured and the valve housing includes a collar projecting from said flange towards the partition, said third piston shell having an end portion forming an annular piston slidingly co-operating with said stem and with said collar to confine said further chamber between said flange and annular piston, labyrinth grooves being provided in one of the co-operating cylinder surfaces of said collar and annular piston.

4. A valve as claimed in claim 1, including a restrictor element in said passage means, said partition element being formed with a metering aperture.

References Cited

UNITED STATES PATENTS

| | | | |
|---|---|---|---|
| 1,825,755 | 10/1931 | Remusnider | 137—505.38 |
| 2,845,086 | 7/1958 | Waterman | 137—504 |
| 2,872,939 | 2/1959 | Terry | 137—504 |
| 3,138,148 | 6/1964 | Cauvin | 137—483 X |

WILLIAM F. O'DEA, *Primary Examiner.*

H. W. WEAKLEY, *Assistant Examiner.*